United States Patent [19] [11] 3,914,878
Lu [45] Oct. 28, 1975

[54] DOUBLE ELECTRONIC BLOCK
[75] Inventor: Jung-Jeng Lu, Taipei, China /Taiwan
[73] Assignee: Jung-Jeng Lu, Taipei, China /Taiwan
[22] Filed: Oct. 9, 1973
[21] Appl. No.: 404,780

[52] U.S. Cl. .......................... 35/19 A; 317/101 CC
[51] Int. Cl.² ........................................ G09B 23/18
[58] Field of Search ... 35/19 A; 317/101 CC, 101 D

[56] References Cited
UNITED STATES PATENTS
| | | | |
|---|---|---|---|
| 3,386,010 | 5/1968 | Nojiri | 35/19 A X |
| 3,576,936 | 5/1971 | Fischer | 35/19 A X |
| 3,594,689 | 7/1971 | Hopt et al. | 35/19 A X |
| 3,651,381 | 3/1972 | Nojiri | 35/19 A X |

*Primary Examiner*—Wm. H. Grieb

[57] ABSTRACT

A double electronic block characterized by comprising two members of insulation which are joined into a cube by means of protrudent ends (105) at one member and relative recesses (106) at the other, having conducting elastic metal strips located therein and connected to the internal circuit elements and indicating on the top side of each member either the indication of circuit or an Arabic numeral so that any child aged from 5 to 12 who has the knowledge of numerals and symbols can build up circuits without need of soldering and help of tools and free from any danger.

2 Claims, 9 Drawing Figures

DOUBLE ELECTRONIC BLOCK

This invention relates a double electronic block to be placed in a special box, with an Arabic numeral on one side and indication of circuit connection on the other, needing no tool or instrument to operate, can be used by children without any difficulty. Incited by the curiosity raised from this invention, the child may even begin to do scientific research from then on.

Reference will be made to the attached drawings, in which:

FIG. 1 is a vertical view of the double electronic block of this invention.

FIG. 2 indicates the connections on the top and bottom of the members.

Figure 6:
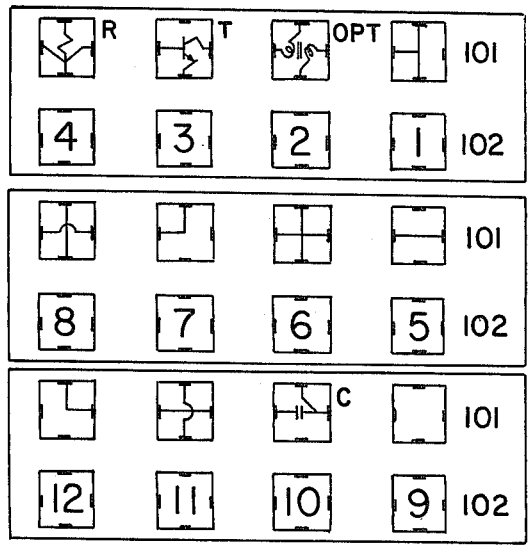
FIG. 6 illustrates the members that are arranged oppositely, correspondingly, and respectively.
Figure 7:
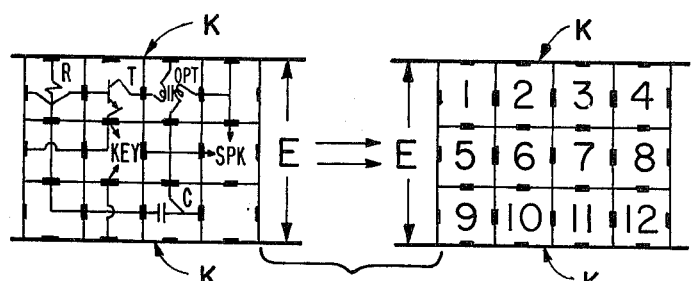
Figure 8:
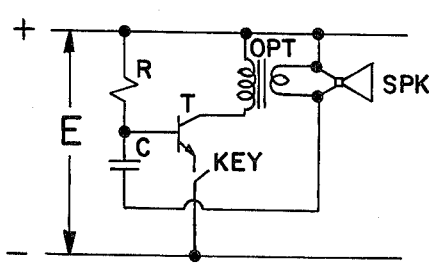

FIG. 7 is an applicative example of FIG. 6. FIG. 8 illustrates the electric circuit for construction design of FIG. 7. FIG. 9 is an applicative example of the separate connections of the two members, one is equipped with a Resistor, and the other is connected with a Condenser.

Figure 1:
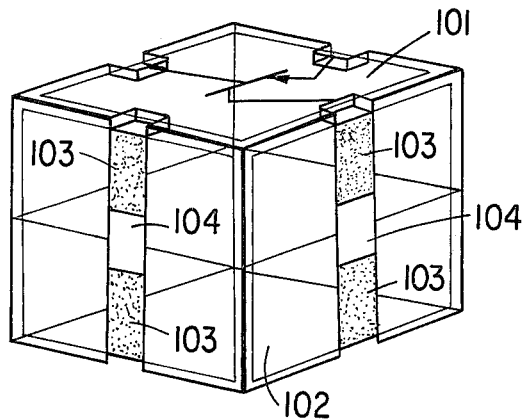
Figure 2:
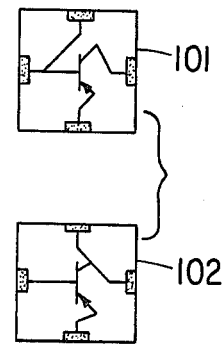
Figure 3:
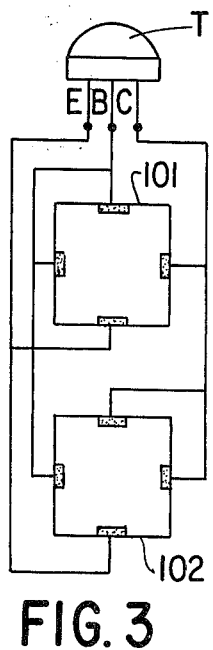
FIG. 3 illustrates the connecting wires of FIG. 2.
Figure 4:
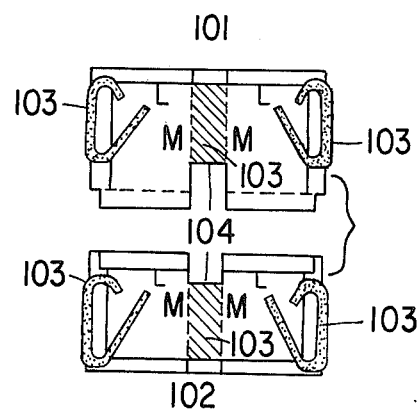
FIG. 4 is a vertical section by the longtitudinal line of an elastic strip as shown in FIG. 1.
Figure 3A:
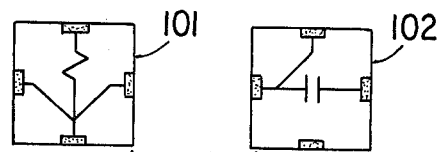

Referring now to the drawings, the electronic elements such as Transistor, Resistor, and Coil are installed inside the cubic double electronic block according to this invention. As the elastic strips 103 of every double electronic block are in contact with one another, a good electric circuit is secured. The plastic block into which members are placed as shown in FIG. 4 has an upper box member 101 and a lower box member 102. The upper member 101 and the lower member 102 may have electronic elements. At the same time, they can also be connected with wires as shown in FIG. 3. When the electric elements are connected and indications of each connections are printed on the top surfaces of member 101 and member 102, the two box members are stuck together with gum to become a double electronic block as shown in FIG. 1. When two members with same connections as shown in FIG. 2 are fixed into a double electronic block, two different electronic circuits in two directions are achieved because member 101 and member 102 are oppositely placed. Thus, the double electronic block is much economical than any other electronic block. The double electronic block can also minimize the adverse effect caused by a longer electric circuit connected.

When two members with different connections are fixed into one electronic block as shown in FIG. 9, and after being designed specially, the upper member 101 can become a separate electric circuit, and so can the lower member 102. If the former is a pre-amplification circuit and if the latter a power amplification circuit, then they will form many circuits, thus saving much of the circuit space and having the same intensive efficiency of the IC circuit.

At four sides of the members 101 and 102 are elastic strips of bronze 103 (Figure 4). Both ends of the said strip 103 are bent into the block as shown in FIG. 4. The electronic elements fixed in the block are soldered to the bent part of the said strip 103. When the strips of the two members aren't connected with each other, the opening 104 becomes an insulation space.

Because of independent circuits, the two members 101 and 102 of the block can have a separate power supply. If necessary, the two strips oppositely fixed to the block can be extended to be an integral strip without the opening 104 as an insulation space, the two units become one, not a combination of two independent units.

As described above, member 101 and member 102 can form two directions of a current. For this reason, this block is more useful than that of a single direction block. For example, the connection is indicated on the top of both member 101 and member 102 with diagram or numerals. If the diagram is not acceptable to the general public, the numerals can be used instead. Thus, the electric circuit can be easily completed by any children who just have learned about the Arabic numerals (FIG. 6).

Figure 5:
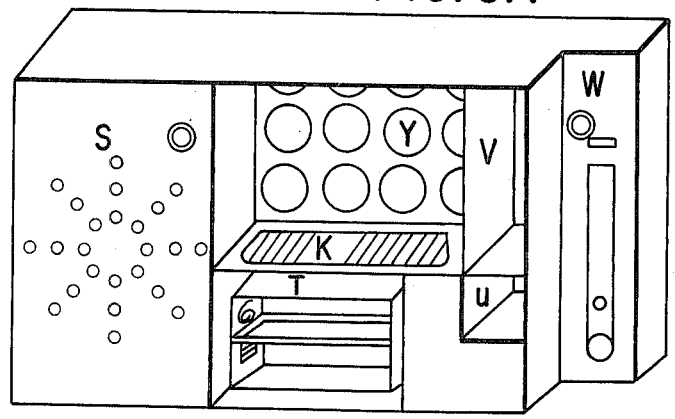
FIG. 5 illustrates the shape of the box specially used by the aforesaid block.

This invention is based on the principle of resiliently connecting as shown in FIG. 7, all components are placed in a special box (FIG. 5). In addition to the resiliently connecting, there is an elastic supply board K in the box to obtain good conductivity and to form a perfect electric circuit. As shown in FIG. 5, the circular aperture Y is used for representation of either the connection or the numeral and for pushing out the double electronic block, V is a connector box, U is a switch box, T is a cell box, W is a key box which has two terminals, S is a speaker box which has two terminals.

FIG. 8, relating to FIG. 7 and FIG. 6, shows an applicative example mode of carrying out this invention, insofar as it concerns the box of FIG. 5, E is the source of electric supply, R is the Resistor, C is the Condenser, T is the Transistor of NPN type, key is an electric key, OPT is an Audio Frequency Transformer, and SPK is a Speaker. Following is a comparison between the aforesaid block and the electronic product made by the Raytheon Education Company of U.S.A.

1. While there are metal strips at the center on all sides of the Raytheon-made electronic square box, this invention has two elastic metal strips for conductivity on all sides, and these strips are insulated with each other and can be melted to be an integral conductivity.

2. If two Roytheon-made electronic square boxes are piled up at the same time, then this device will be respectively independent as shown in FIG. 9. Hence, the said device will not have these advantages: an electronic element with two different directions and multiple-purpose uses.

3. With a box-plate specially designed for use, the aforesaid block can be easily taken out and put back without using a tool. Apart from this, there are visible apertures on the opposite side of the box-plate. That is why a single block has two double directions (two electric circuits) with multiple-purpose uses.

Having described and ascertained the nature of my invention I claim:

1. A double electronic block to be placed in a special box, comprising:

two hollow insulation members, each of said members having a top face, a bottom face, and four side faces, and containing the same electronic component;

one of its members having on its top face a symbol of said electronic component and the other member having on its top face a numeral, whereby two kinds of representation of the same component are affected;

one of said members having a protrusion on its bottom face and the other member having a recess on its bottom face adapted to mate with the protrusion on said one member, whereby said members can be joined together to form a cube;

both of said members having an opening in each of its side faces and four openings in its top face, the openings in each side face being aligned with one of said openings in said top face;

a plurality of elastic conductive metal strips, each strip having one end inserted through an opening in the top side of a block and the other end inserted through an aligned opening in a side face of the same block, thereby to connect with said component;

the openings in said side faces serving as an insulation space so that, when said two members are joined together and pressure is put on them, their metal strips will not touch each other;

so that a plurality of said joined cubes can be assembled into an electronic circuit with either the component symbol faces or the numeral faces uppermost.

2. The double electronic block of claim 1, in combination with said special box, said box comprising:

a board with circular apertures, the area of each aperture being smaller than a top face of said double electronic block but through which the symbol or numeral on the top face may show and through which the block may be pushed out.

* * * * *